United States Patent [19]
Weaver

[11] 3,744,622
[45] July 10, 1973

[54] LUNCH KIT
[75] Inventor: Earl Wilson Weaver, McIntosh, Ala.
[73] Assignees: John D. Woodyard, Calvert; Sam D. Weaver, McIntosh, both of Ala.; part interest to each
[22] Filed: May 3, 1971
[21] Appl. No.: 139,783

[52] U.S. Cl.................... 206/4, 215/6, 215/13 R, 220/16
[51] Int. Cl............................................ A45c 11/20
[58] Field of Search.......................... 206/4; 220/16; 215/6, 13 R

[56] References Cited
UNITED STATES PATENTS
2,326,414 8/1943 Thompson .................. 206/4 UX
2,405,764 8/1946 Smith.................................... 206/4
2,833,436 5/1958 Ruderian ........................... 206/4 X
3,465,905 9/1969 Schottanes............................ 215/6
3,476,277 11/1969 Rownd................................ 215/13 R FOREIGN PATENTS OR APPLICATIONS
734,012 7/1932 France................................. 215/6

Primary Examiner—George E. Lowrance
Assistant Examiner—James R. Garrett
Attorney—John B. Dickman, III

[57] ABSTRACT

A lunch kit including a pair of wide mouth insulated bottles connected through a central compartment for dry food with the heat from the insulated bottles keeping the dry food warm.

4 Claims, 3 Drawing Figures

PATENTED JUL 10 1973
3,744,622
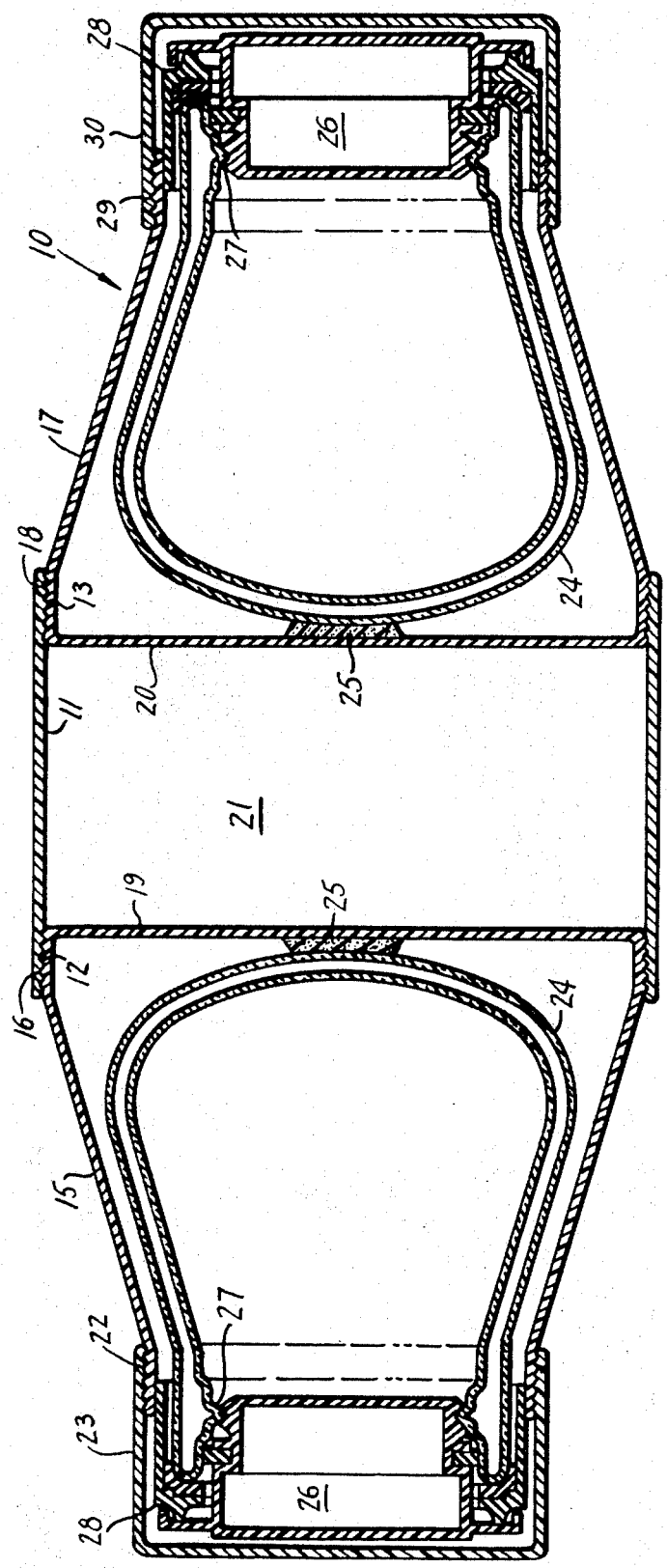
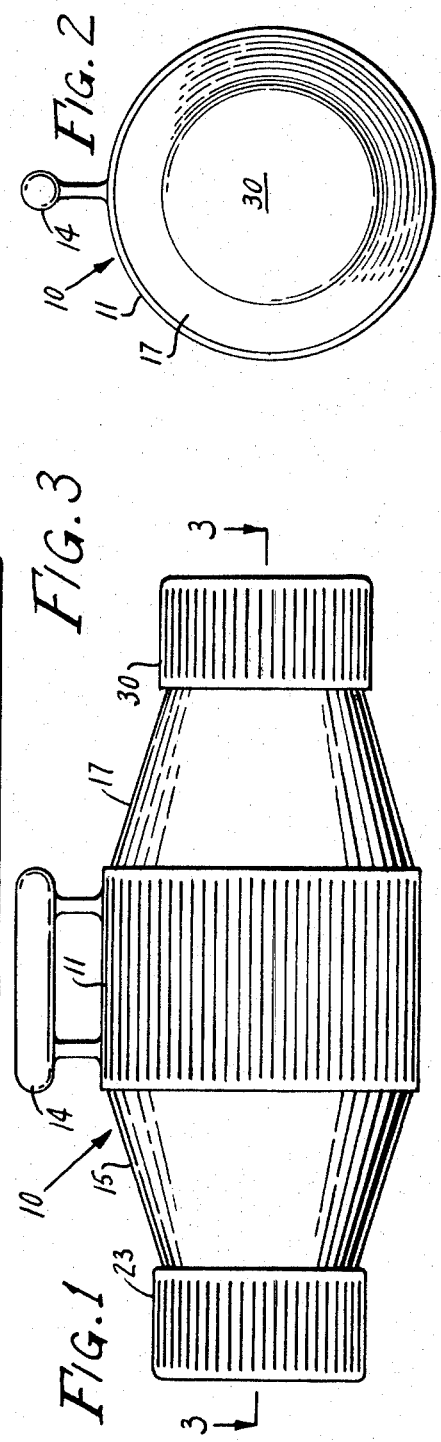
FIG.2
FIG.3
FIG.1
INVENTOR.
EARL W. WEAVER
BY
John B. Dickman III
AGENT.

LUNCH KIT

BACKGROUND OF THE INVENTION

1. Field of the Invention

The present invention relates to a lunch kit of the type adapted to keep different liquids warm and separated and to provide storage for dry food such as a sandwich.

2. Summary of the Invention

The present invention is directed to a lunch kit in which insulated bottles are supported in housings with the housings forming at their base removable covers for a dry food compartment so that heat from the insulated bottles may warm food in the dry food compartment.

The primary object of the invention is to provide a lunch kit which will maintain two separate liquid foods at a desired temperature while warming a dry food compartment.

Other objects and advantages will become apparent in the following specification when considered in the light of the attached drawings.

BRIEF DESCRIPTION OF THE DRAWINGS

FIG. 1 is a side elevation of the invention;

FIG. 2 is an end elevation of the invention; and

FIG. 3 is an enlarged fragmentary longitudinal sectional view taken along the lines 3—3 of FIG. 1, looking in the direction of the arrows.

DESCRIPTION OF THE PREFERRED EMBODIMENT

Referring now to the drawings in detail wherein like reference characters indicate like parts throughout the several figures the reference numeral 10 indicates generally a lunch kit constructed in accordance with the invention.

The lunch kit 10 includes a generally cylindrical hollow central member 11 internally threaded at 12 and 13 at the opposite ends thereof. The cylindrical member 11 has a carrying handle 14 rigidly secured thereto.

An insulated bottle housing 15 has an externally threaded cylindrical portion 16 at its base which is adapted to be threaded into the threads 12 of the member 11. A similar housing 17 has an externally threaded cylindrical base portion 18 which is adapted to be threaded into the threads 13 of the member 11. The housing 15 has a circular bottom wall 19 and the housing 17 has a circular bottom wall 20 so that when assembled into opposite ends of the cylindrical member 11 a dry food compartment 21 is formed.

The housing 15 has an externally threaded cylindrical upper portion 22 to receive an internally threaded cap 23 which screws thereon. A double wall vacuum bottle 24 is positioned in the housing 15 and has a resilient cushion 25 engaged between the bottom wall 19 and the lower end of the vacuum bottle 24 as can be seen in FIG. 3.

A hollow stopper 26 is releasably engaged with the neck 27 of the bottle 24 to seal the bottle 24 and provide insulation for its contents. A retainer collar 28 is provided for engaging and holding the bottle 24 in the housing 15 and extends over the upper edge of the bottle 24.

The housing 17 has an externally threaded upper cylindrical portion 29 to receive an internally threaded cap 30 which engages thereover. A vacuum bottle 24 is mounted in the housing 17 and is constructed identically to the vacuum bottle 24 mounted in the housing 15.

In the use and operation of the invention the housing 15 is unscrewed from the member 11 and sandwiches or other dry food is placed in the compartment 21. The housing 15 is then reengaged with the member 11 to close the dry food compartment 21.

One of the bottles 24 is then filled with a hot beverage and the stopper 26 and cap 23 are replaced thereon. The other vacuum bottle 24 is then filled with a hot food such as, soup or stew and its stopper 26 and cap 30 are replaced. The warmth from the vacuum bottles 24 is transmitted to the food in the space 21 so that this food is also warm at the time it is eaten. This warmth is transmitted to the food by dissipation through the walls of the vacuum bottle.

While I have described the use of the invention as particularly adapted to the carrying of warm foods it should be understood that when desired cold foods can also be carried in the bottles 24 and in the compartment 21.

Having thus described the preferred embodiment of the invention it should be understood that numerous structural modifications and adaptations may be resorted to without departing from the spirit of the invention.

What is claimed is:

1. A lunch kit comprising a generally cylindrical hollow central member, a pair of identical conical housings detachably connected to opposite ends of said central member for closing said central member to form a dry food warming and cooling compartment therein, a vacuum bottle mounted in each of said housings, means for retaining said vacuum bottles in said housings, a stopper for each of said vacuum bottles, and a housing attached cap covering the stopper in each of said housings.

2. A device as claimed in claim 1 wherein said cylindrical member has identical ends, and is internally threaded at each end thereof and said housings are externally threaded to cooperate with the internal threads of said member.

3. A device as claimed in claim 1 wherein said cylindrical member is provided with an integrally formed carrying handle rigidly secured thereto.

4. A device as claimed in claim 1 wherein said identical housings are externally threaded at the ends thereof opposite said member and said caps are threaded over the external threads of said housings.

* * * * *